June 26, 1962 I. R. STUDEBAKER 3,041,545
TIME SENSITIVITY VARIABLE GAIN AMPLIFIER
Filed Oct. 29, 1957
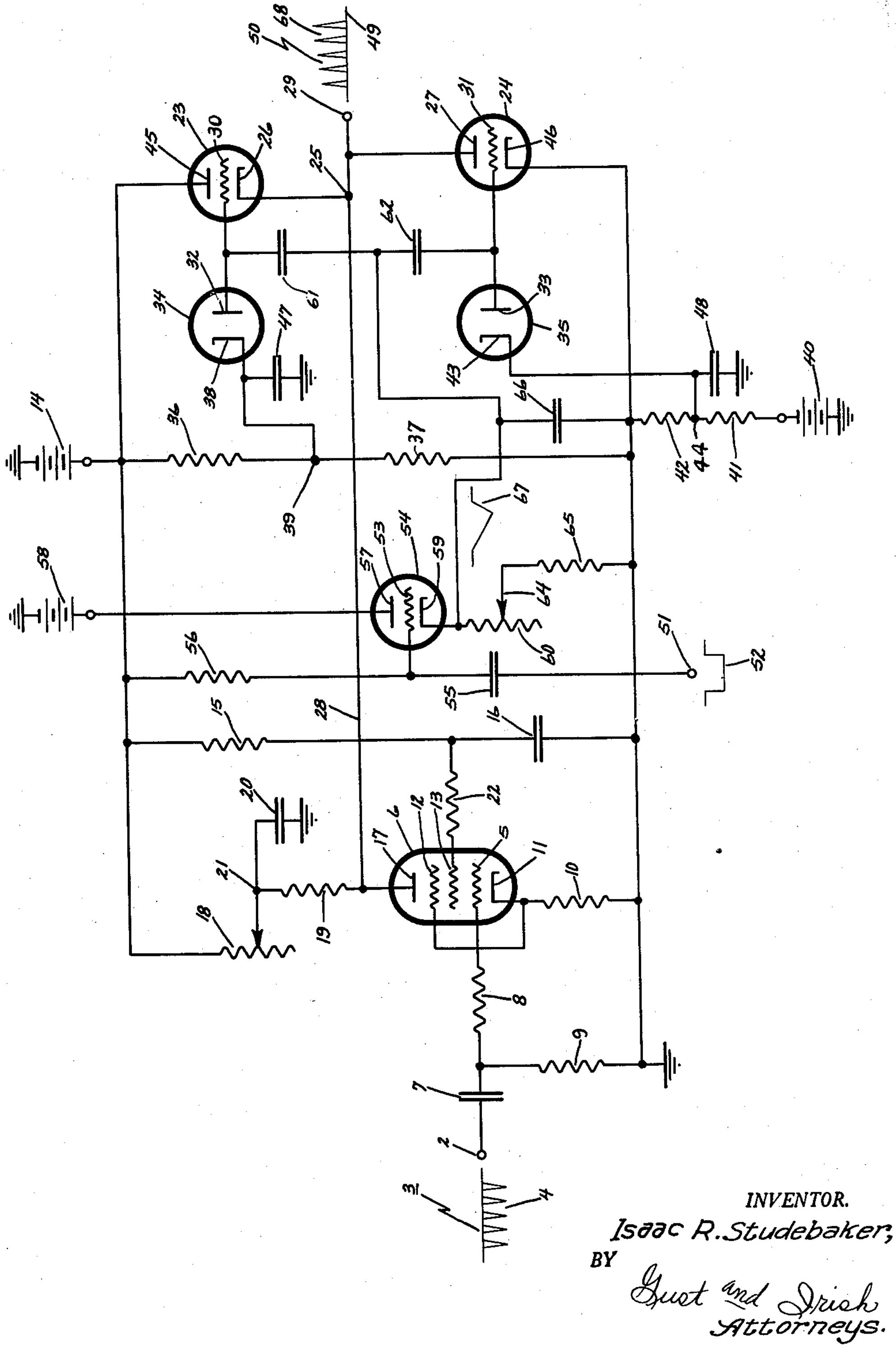
INVENTOR.
Isaac R. Studebaker,
BY
Guot and Irish
Attorneys.

United States Patent Office 3,041,545

Patented June 26, 1962

3,041,545

TIME SENSITIVITY VARIABLE GAIN AMPLIFIER

Isaac Roger Studebaker, Fort Wayne, Ind., assignor to International Telephone and Telegraph Corporation Filed Oct. 29, 1957, Ser. No. 693,144
12 Claims. (Cl. 330—128)

This invention relates to variable gain amplifiers, and more particularly to variable gain amplifiers in which the gain may be varied without tilting the base line of the output signal.

Apparatus, such as plan position indicator (PPI) presentation systems and direct viewing storage tubes with rotary scanning, have in the past had the images or spots appearing on the viewing screen toward the center brighter than those appearing toward the outer edge; this is due to the fact that the electron beam travels faster at the outer edge than it does at the center and further the images or spots are more closely spaced together toward the center than they are toward the outer edge of the viewing screen. It is thus desirable in the design of such systems, in order to have the images or spots toward the outer edge of the viewing screen equal in brightness to those appearing toward the center, to provide a video amplifier circuit in which the gain may be increased toward the outer end of the sweep.

In the past, the gain of video amplifiers for such systems has been varied from the start to the finish of the sweep by driving the suppressor grid of a pentode amplifier tube with a signal having a wave shape corresponding to the desired increase in gain. This method varied the gain of the video amplifier, but also tilted the base line of the resulting signal in the output circuit; in order to eliminate this tilt of the base line, the output signal was fed through a differentiating circuit which, while it removed the tilt in the base line, resulted in poor frequency response, i.e., loss of low frequency information. Furthermore, the base line was actually never completely restored to its desired flat condition and there was a loss of gain in the differentiating circuit. It is therefore desirable to provide an amplifier having a variable gain in which the base line of the output signal is flat without requiring the use of a differentiating circuit.

I have found that the gain of an amplifier may be varied without tilting the base line of the output signal by varying the impedance of the plate circuit of an amplifier tube without varying the direct current potential of the plate. This invention therefore in its broader aspects provides a variable gain amplifier having an input circuit coupled to the control element of an amplifying device which in turn has its load element connected to a source of direct current potential by a fixed impedance. Balanced variable impedance means are coupled to the load element of the amplifier device and thus vary the impedance of the load element without varying its direct current potential thereby to vary the gain of the amplifier without tilting the base line of the output signal. In a specific embodiment of this invention, the amplifier device is a pentode tube with its control grid coupled to the input circuit and with its plate connected to a source of direct current potential by a load resistance. The balanced variable impedance means is a pair of cascode-connected triode tubes connected across a source of direct current potential with their mid-point connected to the plate of the pentode. Circuit connections are provided for respectively biasing the grid of each triode at the same voltage with respect to its plate, and circuit connections are also provided for impressing a control voltage, such as one having a saw-tooth wave form, in phase upon the grids of the triodes thereby simultaneously and equally to vary the impedance of the triodes and thus vary the plate impedance of the pentode without varying its direct current potential. Since the output circuit is likewise connected to the plate of the pentode, the gain of the amplifier is thus varied responsive to the voltage applied to the grids of the triodes without tilting its base line.

It is therefore an object of this invention to provide an improved variable gain amplifier.

Another object of this invention is to provide an improved variable gain amplifier in which the base line of the output signal is not tilted.

A further object of this invention is to provide an improved variable gain amplifier in which the base line of the output signal is not tilted and which employs fewer stages than have heretofore been utilized.

Yet another object of this invention is to provide an improved variable gain amplifier in which the plate impedance of an amplifier tube is varied without varying its plate potential.

A still further object of this invention is to provide an improved video amplifier for a PPI presentation system in which the gain is progressively increased during the sweep without tilting the base line of the output signal.

The above mentioned and other features and objects of this invention and the manner of attaining them will become more apparent and the invention itself will be best understood by reference to the following descriptions of an embodiment of the invention taken in conjunction with the accompanying drawings, wherein:

The single figure of the drawing is a schematic illustration of a video amplifier for a PPI presentation system incorporating my invention.

Referring now to the drawing, my improved video amplifier, has input terminal 2 which may be connected to a suitable source of detected video signals (not shown). Here, the input video signal 3, having negative-going pulses 4, is coupled to the control grid 5 of pentode amplifier tube 6 by means of capacitor 7 and parasitic suppressor resistor 8. Direct current grid return resistor 9 is connected across the mid-point between capacitor 7 and resistor 8 and ground as shown. Cathode resistor 10 connects the cathode 11 of pentode 6 to ground and develops a bias for the control grid 5. The suppressor grid 12 of the pentode 6 is directly connected to the cathode 11 as shown. The voltage of the screen grid 13 of the pentode 6 is decoupled from the source 14 of positive plate voltage, such as 300 volts D.C., by resistor 15 and capacitor 16. Resistor 22 is a parasitic suppressor in the circuit of the screen grid 13 of the pentode 6.

The plate 17 of pentode 6 is connected to source 14 of positive direct current potential by variable resistor 18 and fixed resistor 19. Capacitor 20 connects the junction 21 of resistor 19 and resistor 18 to ground as shown in order to isolate the direct current plate supply from the signal. As will be hereinafter described, variable resistor 18 is employed to establish the proper plate potential to provide a flat base line in the output circuit. It will now be recalled that a pentode tube may be a constant current generator and its gain may be varied by changing its plate-load impedance. It will also be observed that the resistances 18 and 19 connecting the plate 17 of pentode 6 to the source of positive plate potential 14 drain off the quiescent plate current and thus establish a fixed direct current potential for the plate 17. As will be more fully described hereinafter, the plate circuit of the pentode 6 includes two impedances, i.e., resistances 18 and 19 which establish a fixed plate potential and another variable impedance.

The variable impedance component of the plate impedance of the pentode 6 is provided by a pair of triode tubes 23 and 24 connected in series (commonly referred to as "cascode"), as shown, across the source of direct current potential 14 and ground with their midpoint 25 between the cathode 26 of tube 23 and the plate 27 of tube 24 directly connected to the plate 17 of pentode 6 by line 28, as shown. Point 25 is also connected to the output terminal 29. In order to vary the plate impedance of the pentode 6 without varying its plate potential, the grids 30 and 31 of triodes 23 and 24 are respectively connected to anodes 32 and 33 of diodes 34 and 35. A voltage divider comprising serially connected resistors 36 and 37 is connected across the source of positive plate potential 14 to ground with the cathode 38 of diode 34 being connected to point 39 intermediate voltage dividing resistors 36 and 37. A source 40 of negative direct current potential, for example, 150 volts, is provided with a voltage dividing network comprising serially connected resistors 41 and 42 being connected from the source of negative potential 40 to ground as shown. The cathode 43 of diode 35 is directly connected to point 44 between voltage dividing resistors 41 and 42 as shown.

It will now be seen that variable resistor 18 in the plate circuit of plate 17 of pentode 6 may be adjusted until the voltage drop across resistors 18 and 19 is such that the potential of plate 17 is exactly the same as that of point 25 between the triodes 23 and 24, even with the connection 28 removed. Further, the voltage dividing resistors 36, 37, 41 and 42 are proportioned so that the direct current bias on the grids 30 and 31 of triode 23 and 24 is the same with respect to the plates 45 and 27 of triodes 23 and 24. For example, with resistors 36 and 37 proportioned so that grid 30 of triode 23 is at plus 150 volts and voltage divider resistors 41 and 42 proportioned so that grid 31 of triode 24 is at minus 2.1 volts and with the plate 17 and the point 25 at a potential of 152.1 volts, it will be seen that in each case the grids 30 and 31 of the triodes 23 and 24 have a potential approximately 150 volts less than the respective plates 45 and 27 and 2.1 volts minus with respect to the cathodes 26 and 46 respectively. Capacitors 47 and 48 respectively connect points 39 and 44 to ground as shown.

It will now be seen that the grids of the triodes 23 and 24 are respectively clamped to balanced grid bias potentials so that the application of the same voltage in phase to the grids 30 and 31 of the triodes 23 and 24 will simultaneously and equally vary their impedances. It will further be observed that the triodes 23 and 24 are connected in shunt across the cathode and the plate circuit of pentode 6 with triode 23 being in shunt with plate resistors 18 and 19. It will thus be seen that simultaneously and equally varying the impedances of the triodes 23 and 24 will vary the total plate impedance of the pentode 6 without varying its direct current potential, and thus that the base line 49 of the output signal 50 will remain flat.

In order to increase the gain of the pentode 6 during a PPI sweep, an input terminal 51 is provided adapted to be connected to a gate generator (not shown) which provides a negative-going square-shaped pulse 52 which is used to initiate the sweep of the PPI device. The negative gate 52 is coupled to the grid 53 of triode 54 by means of capacitor 55 and resistor 56 connected to the positive source of direct current plate potential 14. The plate 57 of the triode 54 is connected to another source of positive direct current plate potential 58, such as plus 150 volts. The cathode 59 of the triode 54 is connected to a variable resistor 60. The grids 30 and 31 of triodes 23 and 24 have serially connected capacitors 61 and 62 connected thereacross with a midpoint 63 between capacitor 61 and 62 being connected to cathode 59 of triode 54. Movable element 64 on variable resistor 60 is connected to ground by resistor 65.

It will now be seen that the triode 54 and the associated resistors 60 and 65 and capacitor 66 form a saw-tooth wave generator employing a cathode-follower output for converting the square-shaped gate pulse 52 to a negative-going saw-tooth pulse 67, as shown. The negative pulse 67 is applied in phase to the grids 30 and 31 of the triodes 23 and 24 by means of capacitors 61 and 62. It will now be seen that the diodes 34 and 35 clamp the saw-tooth wave form 61, i.e., between sweep times, the diodes 34 and 35 return the grids 30 and 31 to the respective potential set by the voltage divider resistors 36, 37, 41 and 42. Application of the saw-tooth pulse 67 to the grids 30 and 31 of the triodes 23 and 24 increases the impedances of the triodes 23 and 24 and thus the impedance of the plate circuit of pentode 6 without varying the direct current potential of the plate 17 and the output terminal 29. The gain of the pentode 6 is thus increased responsive to the saw-toothed pulse 67, thereby to increase the height of the output pulses 68 without tilting the base line 49 of the output signal 50.

It will be readily apparent that this variable gain amplifier circuit is not limited to use in a PPI presentation system, but may be used in other applications such as a shading generator to correct for shading in cathode ray tubes, in any type of radar viewing scope where a change in video gain is needed, or to intensify signals on a viewing tube face in a desired area. It will also be readily apparent that the control voltage applied to the grids 30 and 31 of the triodes 23 and 24 need not have a saw-tooth configuration but may have any other desired configuration in order to provide the desired gain characteristics.

In the specific embodiment shown, pentode 6 and saw-tooth wave generator triode 54 may be combined in a single envelope and may be a 6U8 and diodes 34 and 35 may also be combined in a single envelope and may be a 6AL5. Triodes 23 and 24 may likewise be combined in a single envelope and be a 6K7A. Furthermore, in the specific circuit shown in the drawing, the other components may have the following values:

| | | |
|---|---|---|
| Capacitor 7 | mfd | .1 |
| Resistor 8 | ohms | 100 |
| Resistor 9 | megohm | 1 |
| Resistor 10 | ohms | 100 |
| Resistor 18 | do | 10,000 |
| Resistor 19 | do | 12,000 |
| Capacitor 20 | mfd | 20 |
| Resistor 20 | mfd | 20 |
| Resistor 22 | ohms | 100 |
| Resistor 15 | do | 47,000 |
| Capacitor 16 | mfd | 20 |
| Resistor 56 | megohms | 22 |
| Capacitor 55 | mfd | .1 |
| Resistor 60 | megohms | 2.5 |
| Resistor 65 | do | 2.7 |
| Capacitor 66 | mfd | .05 |
| Resistors 36 and 37 | ohms | 100,000 |
| Resistor 42 | do | 680 |
| Resistor 41 | do | 47,000 |
| Capacitor 48 | mfd | 25 |
| Capacitor 47 | mfd | .1 |
| Capacitors 61 and 62 | mfd | .05 |

While I have described above the principles of my invention in connection with specific apparatus, it is to be clearly understood that this description is made only by way of example and not as a limitation to the scope of my invention.

What is claimed is:

1. A variable gain amplifier comprising: an input circuit; first amplifier means having a control element coupled to said input circuit and a load circuit including a load element connected to a source of direct current potential by a load impedance; an output circuit coupled to said load element; a pair of cascode-connected amplifier means having their mid-point connected to said load element; circuit connections for impressing a direct current potential across said pair of amplifier means; circuit connections including rectifying means respectively connected to the control elements of said pair of amplifier means for providing a balanced control element direct current bias potential for said pair of amplifier means; and circuit connections for impressing a control voltage in phase on said control elements of said pair of amplifier means simultaneously and equally to vary the impedances thereof thereby to vary the impedance of said load circuit without varying the direct current potential of said load element whereby the gain of said amplifier is varied responsive to said control voltage without tilting the base line of the signal in said output circuit.

2. A variable gain amplifier comprising: an input circuit; a first amplifier device having a control element connected to said input circuit and having a load circuit including a load element connected to a source of direct current potential by a fixed load resistance; a pair of amplifier devices connected in cascode across said source of said direct current potential; an output circuit connected to the mid-point between said pair of amplifier devices; said mid-point being connected to said load element of said first amplifier device; and a circuit connected to impress another signal having a predetermined wave form in phase upon the control elements of said pair of amplifier devices whereby the total load circuits impedance of said first amplifier device may be varied in response to said other signal without varying the direct current potential of said load element thereof so that the gain of said amplifier may be varied without tilting the base line signal of said output circuit.

3. A variable gain amplifier comprising: an input circuit; a pentode amplifier tube having its control grid coupled to said input circuit and having its plate connected to a source of direct current potential by a load resistance; an output circuit coupled to said pentode plate; a pair of cascode-connected triode tubes having the connection between the plate of one tube and the cathode of the other tube connected to said pentode plate, the cathode of said one triode tube and the plate of said other triode tube being connected across a source of direct current potential; circuit connections including a pair of diodes respectively connected to the control grids of said pair of triodes; voltage dividing resistors for respectively providing the same direct current bias potential for the grid of each of said triode tubes with respect to its cathode and plate; and circuit connections for impressing a control voltage in phase on said triodes simultaneously and equally to vary the impedances of said triode tubes thereby to vary the impedance of said pentode plate without varying its direct current potential whereby the gain of said pentode is varied responsive to said control voltage without tilting the base line of the signal in said output circuit.

4. In a PPI presentation system, a variable gain video amplifier comprising: an input circuit adapted to be connected to a source of video signals; first amplifier means having a control element coupled to said input circuit and a load circuit including a load element connected to a source of direct current potential by a load resistance; an output circuit coupled to said load element and adapted to be connected to a PPI presentation device; a pair of cascode-connected amplifier means having their mid-point connected to said load element; circuit connections for impressing a direct current potential across said pair of amplifier means; circuit connections for respectively impressing the same direct current bias potential on the control element of each of said pair of amplifier means with respect to its load element; another input circuit adapted to be connected to a source of sweep timing pulses for said PPI device; means for converting said sweep timing pulses to pulses having a saw-tooth wave form; and circuit connections coupling said last-named means and the control elements of said pair of amplifier means for impressing said saw-tooth pulses in phase thereon simultaneously and equally to vary the impedances of said last-named amplifier means thereby to vary the impedance of said first amplifier means load circuit without varying the D.C. potential of said load element whereby the gain of said amplifier may be varied in response to said saw-tooth pulses without tilting the base line in said signal output circuit.

5. In a PPI presentation system, a variable gain video amplifier comprising: an input circuit adapted to be connected to a source of video signals; a pentode tube having its control grid coupled to said input circuit and having its plate connected to a source of direct current potential by a load resistor; an output circuit coupled to said pentode plate and adapted to be connected to a PPI presentation device; a pair of cascode-connected triode tubes having the connection between the plate of one tube and the cathode of the other tube directly connected to said pentode plate, the cathode of said one triode tube and the plate of said other triode tube being connected across a source of direct current potential; circuit connections including a pair of diodes respectively connected to the grids of said pair of triode tubes; and voltage dividing resistors for respectively providing the same direct current grid bias potential for each of said triode tubes with respect to its cathode and plate; another input circuit adapted to be connected to a source of sweep timing pulses for said PPI device; a saw-tooth generator circuit coupled to said other input circuit for converting said sweep timing pulses into pulses having a saw-tooth wave form; and circuit connections coupling said saw-tooth generator circuit to said grids of said pair of triode tubes for impressing said saw-tooth pulses in phase thereon simultaneously and equally to vary the impedance of said pair of triode tubes thereby to vary the impedance of said pentode plate without varying its direct current potential whereby the gain of said amplifier may be varied in response to said saw-tooth pulses without tilting the base line of the signal in said output circuit.

6. A variable gain amplifier comprising: an input circuit for receiving input signals; amplifier means having a control element coupled to said input circuit and a load circuit coupled across a source of direct current potential and including a load element connected to said source by a resistor; an output circuit coupled to said load circuit; a pair of serially connected balanced variable impedances having their mid-point connected to said load element; circuit connections for impressing said source of direct current potential across the serially connected impedances; and means for simultaneously and equally varying the impedances of said variable impedance means; said resistance being proportioned so that the voltage drop thereacross is equal to the voltage drop across the remainder of said load circuit in the absence of an input signal so that said equal variation of the impedances of said variable impedance means varies the impedance of said load circuit without varying the direct current potential of said load element whereby the gain of said amplifier may be varied without tilting the base line of the signal in said output circuit.

7. A variable gain amplifier comprising: an input circuit for receiving input signals; amplifier means having a control element coupled to said input circuit and a load circuit coupled across a source of direct current potential and including a load element connected to said source by a resistor; an output circuit coupled to said load circuit; and a pair of cascode-connected amplifier means having their midpoint connected to said load element; circuit connections for impressing said direct current potential across said pair of amplifier means; means for impressing a control voltage on the control elements of said pair of amplifier means simultaneously and equally to vary the impedances thereof; said resistance being proportioned so that the voltage drop thereacross is equal to the voltage drop across the remainder of said load circuit in the absence of an input signal so that said equal variation of the impedances of said pair of amplifier means varies the impedance of said load circuit without varying the direct current potential of said load element whereby the gain of said amplifier may be varied responsive to said control voltage without tilting the base line of the signal in said output circuit.

8. A variable gain amplifier comprising; an input circuit for receiving input signals; constant current generating means coupled to said input circuit and having a load circuit coupled across a source of direct current potential and including a load terminal connected to said source by a resistance; means for varying the impedance of said load circuit without varying the direct current potential of said load terminal comprising a pair of cascode-connected amplifier devices having their mid-point connected to said load terminal; an output circuit coupled to said mid-point; and means for impressing a selectively variable voltage on the control elements of said pair of amplifier devices simultaneously and equally to vary the impedances thereof; said resistance being proportioned so that the voltage drop thereacross is equal to the voltage drop across the remainder of said load circuit in the absence of an input signal so that said equal variation of the impedances of said amplifier devices varies the impedance of said load circuit without tilting the base line of the signal in said output circuit.

9. A variable gain amplifier comprising; an input circuit for receiving input signals; constant current generating means comprising a first amplifier device having a control element coupled to said input circuit and having a load element connected to one side of a source of direct current potential by a load resistance and another element connected to the other side of said source; means for varying the load impedance of said first amplifier device without varying the direct current potential of said load element comprising a pair of cascode-connected amplifier devices having their mid-point connected to said load element of said first amplifier device; an output circuit coupled to said mid-point; and circuit connections for impressing a selectively variable voltage on the control elements of said pair of amplifier devices thereby simultaneously and equally to vary the impedances thereof; said resistance being proportioned so that the voltage drop thereacross is equal to the voltage drop across said load and other elements of said first amplifier device in the absence of an input signal so that said equal variation of the impedances of said pair of amplifier devices varies said load impedance of said first amplifier device without tilting the base line of the signal in said output circuit.

10. A variable gain amplifier comprising; an input circuit for receiving input signals; a pentode amplifier tube having its control grid coupled to said input circuit and having its plate connected to one side of a source of direct current potential by a load resistance and its cathode connected to the other side of such source; an output circuit coupled to said pentode plate; a pair of cascade-connected triode tubes having the connection between the plate of one tube and the cathode of the other tube connected to said pentode tube, the cathode of said one triode tube and the plate of said other triode tube being connected across said source of direct current potential; circuit connections including voltage dividing resistors for respectively providing the same direct current grid bias potential for each of said triode tubes with respect to its cathode and plate; and circuit connections for impressing a control voltage in phase on said triode grids simultaneously and equally to vary the impedances of said triode tubes; said resistance being proportioned so that the voltage drop thereacross is equal to the voltage drop across said plate and cathode of said pentode in the absence of an input signal so that said equal variation of the impedances of said triode tubes varies the impedance of said pentode plate without varying its direct current potential whereby the gain of said pentode is varied responsive to said control voltage without tilting the base line of the signal in said output circuit.

11. A variable gain amplifier comprising; an input circuit for receiving input signals; a first amplifier device having a control element connected to said input circuit and having a load circuit coupled across a source of direct current potential and including a load element connected to said source by a load resistance; a pair of amplifier devices connected in cascode across said source of direct current potential; an output circuit connected to the mid-point between such pair of amplifier devices; said mid-point being connected to said load element of said first amplifier device; and a circuit connected to impress another signal having a predetermined waveform in phase upon the control elements of said pair of amplifier devices thereby simultaneously and equally to vary the impedances thereof; said resistance being proportioned so that the voltage drop thereacross is equal to the voltage drop across the remainder of said load circuit in the absence of said input signal so that the total load circuit impedance of said first amplifier device is varied in response to said other signal without varying the direct current potential of said load element so that the gain of said first amplifier device is varied without tilting the base line of the signal in said output circuit.

12. In a PPI presentation system, a variable gain video amplifier comprising: an input circuit adapted to be connected to a source of video signals; first amplifier means having a control element coupled to said input circuit and having a load circuit connected across a source of direct current potential including a load element connected to said source by a load resistance; an output circuit coupled to said load element and adapted to be connected to a PPI presentation device; a pair of cascode-connected amplifier means having their mid-point connected to said load element; circuit connections for impressing said direct current potential across said pair of amplifier means; another input circuit adapted to be connected to a source of sweep timing pulses for said PPI device; means for converting said sweep timing pulses to pulses having a saw-tooth waveform; and circuit connections coupled to said last-named means for impressing said saw-tooth pulses on the control elements of said pair of amplifier means simultaneously and equally to vary the impedances thereof; said resistance being proportioned so that the voltage drop thereacross is equal to the voltage drop across the remainder of said load circuit in the absence of an input signal so that said equal variations of the impedances of said pair of amplifier means varies the impedance of said load circuit without varying the direct current potential of said load element whereby the gain of said first amplifier means is varied in response to said sawtooth pulses without tilting the base line of the signal in said output circuit.

References Cited in the file of this patent

UNITED STATES PATENTS

| | | |
|---|---|---|
| 2,535,912 | Frank | Dec. 26, 1950 |
| 2,554,458 | Graham | May 22, 1951 |
| 2,558,519 | Hill | June 26, 1951 |
| 2,617,037 | Hugenholtz | Nov. 7, 1952 |
| 2,692,306 | Hathaway et al. | Oct. 19, 1954 |
| 2,730,575 | Hayden-Pigg | Jan. 10, 1956 |
| 2,761,919 | Stillwell | Sept. 4, 1956 |
| 2,776,343 | Yuni | Jan. 1, 1957 |
| 2,794,077 | Olson | May 28, 1957 |
| 2,914,622 | Jacobsen | Nov. 24, 1959 |